(12) United States Patent
Suleman et al.

(10) Patent No.: US 11,727,042 B2
(45) Date of Patent: Aug. 15, 2023

(54) METHOD AND SERVER FOR CLASSIFYING QUERIES

(71) Applicant: Microsoft Technology Licensing, LLC, Redmond, WA (US)

(72) Inventors: Kaheer Suleman, Cambridge (CA); Wilson Hsu, Waterloo (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 614 days.

(21) Appl. No.: 15/319,753

(22) PCT Filed: Jul. 17, 2015

(86) PCT No.: PCT/IB2015/055447
§ 371 (c)(1),
(2) Date: Dec. 16, 2016

(87) PCT Pub. No.: WO2016/009410
PCT Pub. Date: Jan. 21, 2016

(65) Prior Publication Data
US 2017/0154105 A1    Jun. 1, 2017

Related U.S. Application Data

(60) Provisional application No. 62/026,181, filed on Jul. 18, 2014.

(51) Int. Cl.
*G06F 16/35* (2019.01)
*G06F 16/33* (2019.01)

(52) U.S. Cl.
CPC .......... *G06F 16/35* (2019.01); *G06F 16/3331* (2019.01); *G06F 16/3349* (2019.01)

(58) Field of Classification Search
CPC .................................................. G06F 16/3331
See application file for complete search history.

(56) References Cited

U.S. PATENT DOCUMENTS

| | | |
|---|---|---|
| 8,386,401 B2 | 2/2013 | Virkar et al. |
| 8,407,214 B2 | 3/2013 | Li et al. |
| 8,458,213 B2 | 6/2013 | Edmonds et al. |
| 8,548,951 B2 | 10/2013 | Solmer et al. |
| 8,666,983 B2 * | 3/2014 | Brill .................... G06F 16/3329 707/737 |

(Continued)

FOREIGN PATENT DOCUMENTS

WO    2013155619 A1    10/2013

OTHER PUBLICATIONS

PCT International Search Report and Written Opinion in PCT/IB2015/055447, dated Sep. 30, 2015, 17 pages.

(Continued)

*Primary Examiner* — Mark D Featherstone
*Assistant Examiner* — Tony Wu

(57) ABSTRACT

A server, method, and non-transitory computer readable medium for classifying queries based on contextual information are provided. The server includes a network interface, a memory storage unit and a processor. The method involves receiving a plurality of queries, analyzing the queries and determining a likelihood divergence and selecting a domain. The non-transitory computer readable medium is encoded with programming instructions to direct a processor to carry out the method.

20 Claims, 9 Drawing Sheets

(56) References Cited

U.S. PATENT DOCUMENTS

| | | | |
|---|---|---|---|
| 8,688,623 B2 | 4/2014 | Shah et al. | |
| 2003/0126136 A1* | 7/2003 | Omoigui | H04L 29/06 |
| 2005/0210008 A1* | 9/2005 | Tran | G06F 16/951 |
| 2007/0005646 A1 | 1/2007 | Dumais et al. | |
| 2009/0094223 A1* | 4/2009 | Berk | G06F 16/3338 |
| 2009/0327260 A1 | 12/2009 | Li et al. | |
| 2010/0153324 A1* | 6/2010 | Downs | G06F 40/258 |
| | | | 706/21 |
| 2010/0169361 A1* | 7/2010 | Chen | G06F 16/285 |
| | | | 707/769 |
| 2011/0213655 A1 | 9/2011 | Henkin et al. | |
| 2011/0314010 A1* | 12/2011 | Ganti | G06F 16/2425 |
| | | | 707/728 |
| 2013/0238608 A1* | 9/2013 | Sia | G06F 16/334 |
| | | | 707/723 |
| 2014/0059030 A1 | 2/2014 | Hakkani-Tur et al. | |
| 2014/0079297 A1 | 3/2014 | Tadayon et al. | |
| 2014/0101119 A1* | 4/2014 | Li | G06F 16/3331 |
| | | | 707/706 |
| 2014/0172815 A1* | 6/2014 | Jammalamadaka | |
| | | | G06F 16/3338 |
| | | | 707/706 |

OTHER PUBLICATIONS

PCT International Preliminary Report on Patentability in PCT/IB2015/055447, dated Jan. 24, 2017, 12 pages.

"European Search Report Issued in European Patent Application No. 15822796.7", dated Jul. 19, 2018, 09 Pages.

"Office Action Issued in European Patent Application No. 15822796.7", dated Apr. 15, 2020, 9 Pages.

* cited by examiner

METHOD AND SERVER FOR CLASSIFYING QUERIES

CROSS-REFERENCE TO RELATED APPLICATION

This application is a U.S. National Stage Application of PCT/IB2015/055447, filed Jul. 17, 2015, which claims the benefit of U.S. Provisional Patent Application No. 62/026,181, filed Jul. 18, 2014, which applications are hereby incorporated by reference in their entireties. To the extent appropriate, a claim of priority is made to each of the above disclosed applications.

FIELD

The present specification relates classifying queries and more particularly to classifying queries based on contextual information.

BACKGROUND

Processing multiple queries received from a user in the form of natural language is often difficult for a machine if the queries are related to one another. In natural language processing, queries are often classified into one of several possible domains based on the analysis of the words in the query. When multiple queries are related to each other, the queries are generally within the same domain. However, an analysis of the additional query can lead to it being classified into another domain, which would not be the intent of the user.

When a speaker and listener interact using natural language, the generally understand whether a subsequent query is related to an initial query. However, this understanding is not reliably based on any rules easily programmed into a machine for recognition.

SUMMARY

In accordance with an aspect of the specification, there is provided a server for classifying queries based on contextual information. The server includes a network interface for receiving a first query and a second query. The second query received subsequent to the first query. Furthermore, the server includes a memory storage unit for storing the input query and for storing programming instructions. In addition, the server includes a processor in communication with the network interface and the memory storage unit. The processor is configured to analyze the first query to determine a first domain associated with the first query and to analyze the second query to determine a second domain associated with the second query. The first domain and the second domain are different. The processor is further configured to determine a likelihood of divergence of the second domain from the first domain and to select one of the first domain and the second domain for processing the second query. Selecting one of the first domain and the second domain is based on the likelihood of divergence.

The processor may be configured to analyze the first query by applying a support vector machine model to the first query.

The processor may be configured to analyze the first query and to analyze the second query using a similar set of operations.

The processor may be configured to determine a likelihood by determining a Kullback-Leibler divergence between the first domain and the second domain.

The processor may be configured to calculate a plurality of Kullback-Leibler divergences. The plurality of Kullback-Leibler divergences may include the Kullback-Leibler divergence. Each Kullback-Leibler divergence may be associated with a feature of the second query.

The processor may be configured to calculate a sum of the plurality of Kullback-Leibler divergences.

The processor may be configured to select the second domain when the sum is greater than a predetermined threshold.

The predetermined threshold may be zero.

The processor may be configured to analyze the second query after excluding cue phrases from consideration.

In accordance with an aspect of the specification, there is provided a method of classifying queries based on contextual information. The method involves receiving a first query. The method further involves analyzing the first query to determine a first domain associated with the first query. In addition, the method involves receiving a second query subsequent to the first query. Furthermore, the method involves analyzing the second query to determine a second domain associated with the second query. The second domain is different from the first domain. Also, the method involves determining a likelihood of divergence of the second domain from the first domain. The method further involves selecting one of the first domain and the second domain for processing the second query, wherein selecting is based on the likelihood of divergence.

Analyzing the first query may involve applying a support vector machine model to the first query.

Analyzing the first query and analyzing the second query uses a similar set of operations.

Determining a likelihood may involve determining a Kullback-Leibler divergence between the first domain and the second domain.

A plurality of Kullback-Leibler divergences may be calculated. The plurality of Kullback-Leibler divergences may include the Kullback-Leibler divergence. Each Kullback-Leibler divergence may be associated with a feature of the second query.

Determining a likelihood may involve calculating a sum of the plurality of Kullback-Leibler divergences.

Selecting may involve selecting the second domain when the sum is greater than a predetermined threshold.

The predetermined threshold may be zero.

Analyzing the second query may involve excluding cue phrases from consideration.

In accordance with an aspect of the specification, there is provided a non-transitory computer readable medium encoded with codes for classifying queries based on contextual information. The codes are for directing a processor to receive, via a network interface, a first query and a second query. The second query being subsequent to the first query. In addition, the codes are for directing the processor to analyze the first query to determine a first domain associated with the first query. Furthermore, the codes are for directing the processor to analyze the second query to determine a second domain associated with the second query. The second domain being different from the first domain. The codes are for further directing the processor determine a likelihood of divergence of the second domain from the first domain. Also, the codes are for directing the processor to select one of the first domain and the second domain for processing the second query. Selecting is based on the likelihood of divergence.

BRIEF DESCRIPTION OF THE DRAWINGS

Reference will now be made, by way of example only, to the accompanying drawings in which.

DETAILED DESCRIPTION OF THE EMBODIMENTS

Figure 1:
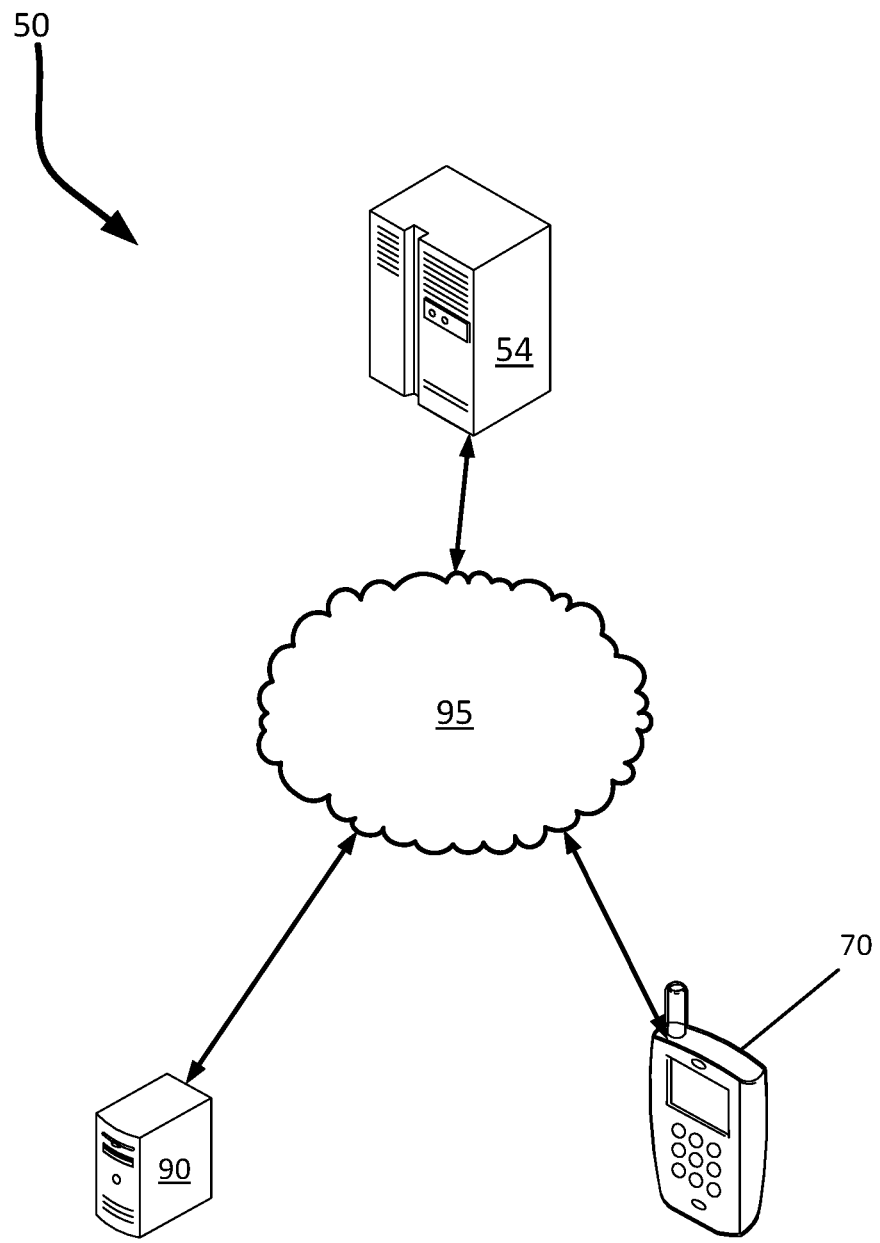
FIG. 1 is a schematic representation of a system for classifying queries based on contextual information in accordance with an embodiment.

Referring to FIG. 1, a schematic representation of a computer network system is shown generally at 50. It is to be understood that the system 50 is purely exemplary and it will be apparent to those skilled in the art that a variety of computer network systems are contemplated. The system 50 includes a server 54, a client device 70, and a data source 90 for providing information. The server 54, the client device 70, and the data source 90 are connected by a network 95. The network 95 is not particularly limited and can include any type of network such as the Internet, an intranet, a local area network, a mobile network, or a combination of any of these types of networks. In some embodiments, the network 95 can also include a peer to peer network.

In the present embodiment, the server 54 can be any type of computing device generally used to receive input, process the input and provide output. The server 54 is not particularly limited and can include a variety of different devices depending on the specific application of the server 54. For example, the server 54 can be optimized for its specific role in the system 50, such as for communicating with the client device 70 and the data source 90. Suitable devices the server 54 can include high performance blade server systems running UNIX operating systems, and having multiple processors. Alternatively, the server 54 can include devices such as a personal computer, a personal digital assistant, a tablet computing device, cellular phone, or laptop computer configured to carry out similar functions for systems not requiring a server with significant processing power. In other embodiments, the server 54 can also be implemented as a virtual server, a rented server session in the cloud, or any combination of the above.

The client device 70 can be any type of computing device used to communicate with the server 54 over the network 95 for generally handling input queries from a user. It is to be appreciated that, in general, the client device 70 includes programming instructions in the form of codes stored on a computer readable medium for performing the functions, such as in the form of a downloadable application. For example, the client device 70 can be any one of a personal computer, a laptop computer, a portable electronic device, a gaming device, a mobile computing device, a portable computing device, a tablet computing device, a personal digital assistant, a cell phone, a smart phone or the like. In the present embodiment, the client device 70 is configured to receive an input query from a user and to send an input query to the server 54 and to provide information in response to the input query. The input query is not particularly limited and can be any type of input query, such as a request for information from the data source 90 or an instruction to control the client device 70. In addition, the format of the input query is not particularly limited. For example, the input query can be received as an audio input via a microphone or as a text string received via a keyboard-type input device.

In the present embodiment, the data source 90 is generally configured to provide information upon receiving an input query. The manner by which the data source 90 operates is not particularly limited. For example, in the present embodiment, the data source 90 can be associated with a service provider. In particular, the data source 90 can be associated with a service providers that offers a database of general businesses, such as restaurants, hotels, theatres, etc. for which a user at the client device 70 may want to search or obtain more information. As another example, the data source 90 can be associated with service providers that provide information such as weather, news, or general knowledge. It is to be appreciated, with the benefit of this description, that although a single data source 90 is shown in FIG. 1, it is not necessarily limited to the data source 90. For example, in other embodiments, the system 50 can be modified to include a plurality of data sources where each data source can provide different information for the server 54 to query dependent on a request from the client device 70. In further embodiments, the data source 90 can be modified to be part of a database within the server 54, or can be omitted altogether when no external information is requested, such as for an input query from the client device 70 to the server 54 to control a local feature of the client device 70.

It is to be re-emphasized that the system 50 described above is a non-limiting representation only. For example, although the network 95 of the present embodiment shown in FIG. 1 connects the server 54, the client device 70, and the data source 90, other embodiments can include separate networks for connecting the server 54 to the client device 70, and the server 54 to the data source 90. As another example of the variation, the server 54 can be omitted in some embodiments and the functionality entirely incorporated into each client device 70.

Figure 2:
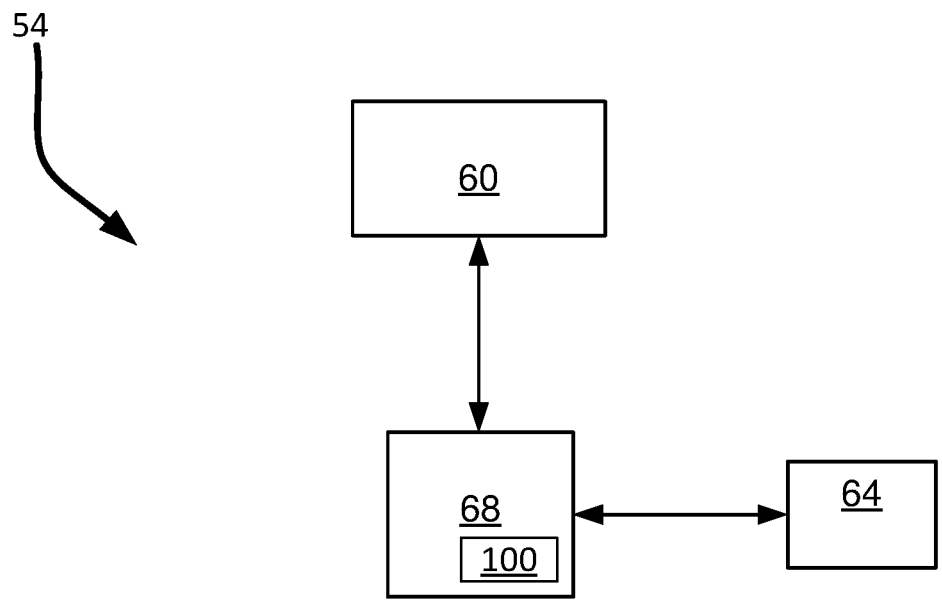
FIG. 2 is a schematic representation of a server in accordance with the embodiment shown in FIG. 1.

Referring to FIG. 2, a schematic block diagram showing various components of the server 54 is provided. It should be emphasized that the structure in FIG. 2 is purely exemplary and several different implementations and configurations for the server 54 are contemplated. The server 54 includes a network interface 60, a memory storage unit 64, and a processor 68.

The network interface 60 is not particularly limited and can include various network interface devices such as a network interface controller (NIC) capable of communicating with the client device 70 and the data source 90 across the network 95. In the present embodiment, the network interface 60 is generally configured to connect to the network 95 via a standard Ethernet connection.

The memory storage unit 64 can be of any type such as non-volatile memory (e.g. Electrically Erasable Programmable Read Only Memory (EEPROM), Flash Memory, hard disk, floppy disk, optical disk, solid state drive, or tape drive) or volatile memory (e.g. random access memory (RAM)). In the present embodiment, the memory storage unit 64 is generally configured to temporarily store input queries received from the client device 70 for processing as well as any input queries for sending to the data source 90. In addition, the memory storage unit 64 is configured to store codes for directing the processor 68 for carrying out computer implemented methods. For example, the codes can include the programming instructions 100 further described below.

The processor 68 is not particularly limited and is generally configured to execute programming instructions 100 for classifying entities of an input query. The manner by which the entities of the input queries are classified is not particularly limited and will be discussed in greater detail below. For example and to provide greater clarity to the understanding of the present embodiment, it can be assumed that the input query includes at least two of entities of the same type, such as a start time and an end time where both entities are of the time type. It is to be appreciated, with the benefit of this specification that an entity type is not particularly limited and generally determined based on a comparison of the distribution of features are similar when extracted using a conditional random field model. As another example, an origin and a destination in regard to navigation can be of the same type since they are both places. Further examples of entity types are provided in Table 1.

TABLE 1

Examples of Entities and description

| Entity | Description/Examples |
|---|---|
| DATERANGE/DATE | Exact or relative date or date range (e.g. Mar. 5, 2005, two days from now, on the weekend) |
| TIMERANGE/TIME | Exact or relative time or time range (e.g. 3 pm, in 2 hours, between 3 and 5 pm) |
| REPEATDAYS | Date indicating a repetition (every Tuesday, every week) |
| APPNAME | Application name |
| WEBSITE | Website address |
| SETTING | Device setting (e.g. BLUETOOTH connection, WIFI connection, sound setting) |
| VALUE | Value for which a setting will be set to (e.g. on, off, 50 percent, 50 dB, or other units or arbitrary values) |
| CONTACTNAME | A contact to call, message, email or invite to a meeting |
| LOCATION | A location of an event, business, etc., (e.g. Toronto, 24th and Mission St, room 202) |
| MEETINGTITLE | A title of a meeting |
| CONTACTFIELD | A field in a contact/address book |
| FRIENDORRELATIVE | A relation (e.g. mom, dad, boss) |
| MOVIE_NAME | A name of a movie |
| MEDIA_ACTOR | A name of an actor or actress |
| MOVIE_THEATRE | A name of a movie theatre |
| COMPANY | A name of a publicly traded company |
| MARKET | A name of a stock market or index |
| STATISTIC | A statistic or average relating to either shares of a publicly traded company or sports team/athlete (e.g. points per game, 52 week high) |
| KEYWORDS | Keywords extracted for search |
| ACCOUNT | An email or messaging account |
| MESSAGEBODY | Contents of a text message, FACEBOOK post, email, reminder, etc., |
| PHONENUMBER | A phone number |
| EMAILSUBJECT | A subject of an email |
| ALBUM | A name of an album of music |
| ARTIST | A name of a music artist |
| SONG | A name of a song |
| GENRE | A genre of music, movie, TV show, etc. |
| BUSINESSNAME | A name of a business |
| BUSINESSTYPE | A type of business (e.g. restaurant, doctor) |
| ATHLETE | A name of an athlete |
| DIVISION | A name of a division in a sports league (e.g. American League) |
| LEAGUE | A name of a sports league (e.g. MLB, NHL, NBA) |
| POSITION | A position of an athlete on a sports team (e.g. quarterback, point guard, center) |
| SPORT | A name of a sport |
| SPORTSTEAM | A name of a sports team (e.g. Dallas Mavericks, Manchester United) |
| TOURNAMENT | A name of a tournament or championship (e.g. Stanley Cup, Superbowl) |
| DESTINATION | A destination of a navigation request |
| ORIGIN | An origin of a navigation request |

In the present embodiment, the programming instructions 100 include a natural language processing engine. It is to be appreciated that several different types of natural language processing engines are contemplated. For example, the natural language processing engine can be based on support vector machine analysis, decision trees, Bayesian networks, neural networks, recurrent neural networks, recursive neural networks, or any combination thereof. In general, the server 54 receives an input query from the client device 70 via the network interface 60. The programming instructions 100 can direct the processor 68 to analyze the input query and to carry out a primary classification on the input query to determine a domain to which the input query belongs. For example, in the present embodiment, the input query can be classified into one of the domains listed in Table 2. It is to be appreciated, with the benefit of this description, that the number and types of domains are not limited and that domains listed in Table 2. Subsequently, the natural language processing engine proceeds to conduct name entity recognition followed by a secondary classification. The manner by which the input query is received is not particularly limited and the input query can be received in one or more formats. For example, the input query can be in the form of a text string or an audio file.

TABLE 2

Examples of Domains and description

| Domain | Subdomain (if applicable) | Description/Examples |
|---|---|---|
| NAVIGATION | NAVIGATION_X_TO_Y | Navigate to a location (Y) from an origin location (X) |
| | NAVIGATION_ON_MAP | Show a map of a specific location |
| SPORTS | SPORTS_SCORE | Show score of a game |
| | SPORTS_SCHEDULE | Show schedule of a player or team |
| | SPORTS_PLAYER_INFO | Show information about a player |
| | SPORTS_TEAM_INFO | Show information about a team |
| | SPORTS_STATISTICS_GAME | Show in game statistics for a player or team |
| | SPORTS_ROSTER | Show a team roster |
| | SPORTS_INJURY_REPORT | Show an injury report of a player or team |
| | SPORTS_LEAGUE_LEADERS | Show player or team leading a specific category or division |
| BUSINESS/ RESTAURANT | BUSINESS/RESTAURANT_SEARCH | Search restaurants or businesses |
| | RESTAURANT_RESERVATION | Request a reservation at a specific restaurant |
| | BUSINESS/RESTAURANT_HOURS | Search restaurants or businesses by their opening hours |
| SEARCH | | Search Internet |
| SOCIAL | | Posting/viewing various social networks |
| REMINDER | REMINDER_SET | Create a reminder |
| MUSIC | | Control music player |
| MESSAGING_SEND | MESSAGING_SEND | Send messages via various text messaging systems |
| | MESSAGING_SEND_EMAIL | Send messages via email |
| MESSAGING_READ | | Search and read email and or text messages |
| FINANCE | | Request stock information on publicly traded companies |
| ENTERTAINMENT | ENTERTAINMENT_MOVIE | Request showtimes for movies currently playing theatres |
| CONTACT | | Search address book |
| CALL | CALL_CALLING | Make a phone call |
| | CALL_CHECK_VOICEMAIL | Access voicemail messages |
| | CALL_CHECK_MISSED_CALLS | Show list of missed calls |
| CALENDAR | | Manage a calendar |
| APPLICATION | APPLICATION_LAUNCH | Launch an application |
| | APPLICATION_WEBSITE | Open up a website |
| | APPLICATION_PHONE_SETTINGS | Change current device settings |
| ALARM | | Manage alarms on the device |

Figure 3:
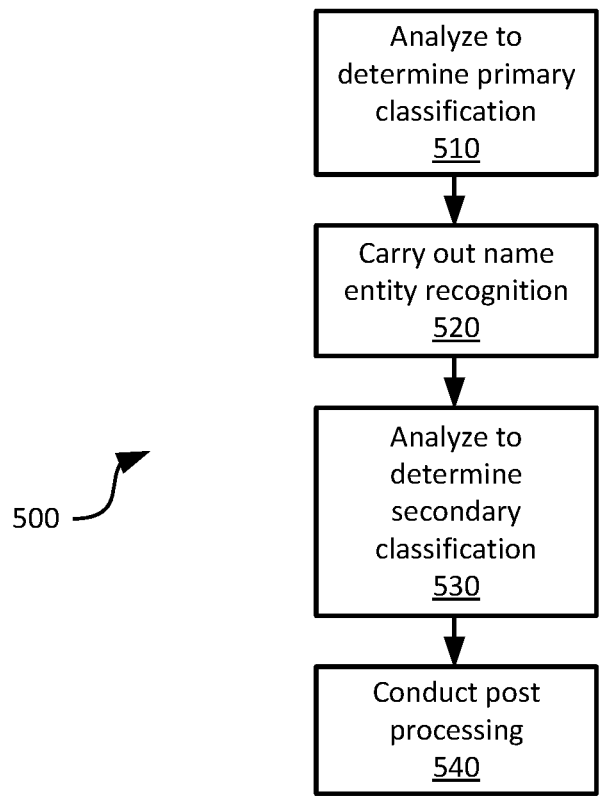
FIG. 3 is a flow chart of a method of classifying queries based on contextual information in accordance with an embodiment.

Referring to FIG. 3, a method of processing queries carried out by the natural language processing engine is represented in the form of a flow-chart and indicated generally at 500. In order to assist in the explanation of the method 500, it will be assumed that the method 500 is performed using the system 50. Furthermore, the following discussion of the method 500 will lead to further understanding of the system 50 and its various components. In particular, it is to be understood that in one embodiment, the programming instructions 100 of the server 54 direct the processor 68 to carry out the methods discussed below. However, it is to be understood that the system 50 and/or the method 500 can be varied, and need not work exactly as discussed herein in conjunction with each other, and that such variations are within the scope of the present invention. Furthermore, it is to be emphasized, that method 500 need not be performed in the exact sequence as shown and that various blocks can be performed in parallel rather than in sequence; hence the elements of the method 500 are referred to herein as "blocks" rather than "steps".

Block 510 comprises analyzing the input query received at the server 54 to determine a primary classification for the input query. The manner by which the analysis for determining the primary classification is carried out is not particularly limited and can involve various classification methods. In the present embodiment, a predetermined number of domains are available into which the input query can be classified. Binary support vector machines are used to compare each possible pair of domains. After determining the results of the binary support vector machines, a voting scheme is used to determine the domain into which the input query should be placed for further analysis. It is to be appreciated, with the benefit of this description that the analysis to determine the primary classification is not particularly limited and that other manners of carrying out the analysis can be used. For example, other embodiments can use a random forest models, neural networks, recurrent neural networks, recursive neural networks, deep neural networks, naïve Bayes, logistic regression techniques, decision tree learning, and other multi-class classifiers.

It is to be understood that the method describe in block 510 can also be modified to include further steps as discussed in greater detail below. In particular, block 510 describes a blank state classification, where no prior information, such as context, is considered. It is to be appreciated that in other embodiments, contextual information can be considered in determining a domain into which the input query is to be classified for greater accuracy. However, in some cases, an input query is intended to have no contextual information, such as when the input query is meant to change the subject. For example, if a previous query requested information regarding sushi restaurants and a subsequent query is simply "What is within one kilometer?", block 510 would not consider the previous query. Instead, block 510 would send the input query to the data source 90 to retrieve all points of interest within a kilometer of the location of the client device 70.

Block 520 comprises carrying out name entity recognition on the input query. The manner by which the name entity recognition is carried out is not particularly limited and can involve various operations or processes. In the present embodiment, a conditional random field model is used to tag entities. After recognizing the name entities, the entities are passed onto block 530. It is to be appreciated, with the benefit of this description that the name entity recognition is not particularly limited and that other manners of carrying out recognition can be used. For example, other embodiments can use a various Markov models.

Block 530 comprises analyzing the input query to determine a secondary classification for the input query. The manner by which the analysis for determining the secondary classification is carried out is not particularly limited and can involve various classification methods. In the present embodiment, a predetermined number of subdomains within each domain are available into which the input query can be classified. Rules are used to determine the appropriate subdomain based on the entities recognized in block 520. It is to be appreciated, with the benefit of this description that the analysis to determine the secondary classification is not particularly limited and that other manners of carrying out the analysis can be used. For example, other embodiments can use a naïve Bayes classifier.

Block 540 comprises conducting post processing on the input query. The manner by which the natural language engine carries out post processing is not particularly limited and can be dependent on the nature of the input query determined in blocks 510 to 530. For example, post processing can include identifying broader categories for each entity identified in block 520. As another example, the post processing process can be used to normalize entities identified as dates in block 520 when the input query is classified within a specific subdomain identified in block 530. In this example, if the input query is classified as a calendar event update, entities identified as dates can be converted into a machine readable format.

It is to be re-emphasized that the method 500 described above is a non-limiting representation only and that variations are contemplated. For example, although only two analysis steps to classify the input query are shown in the present example, it is to be appreciated that more or less analysis steps can be used.

Figure 4:
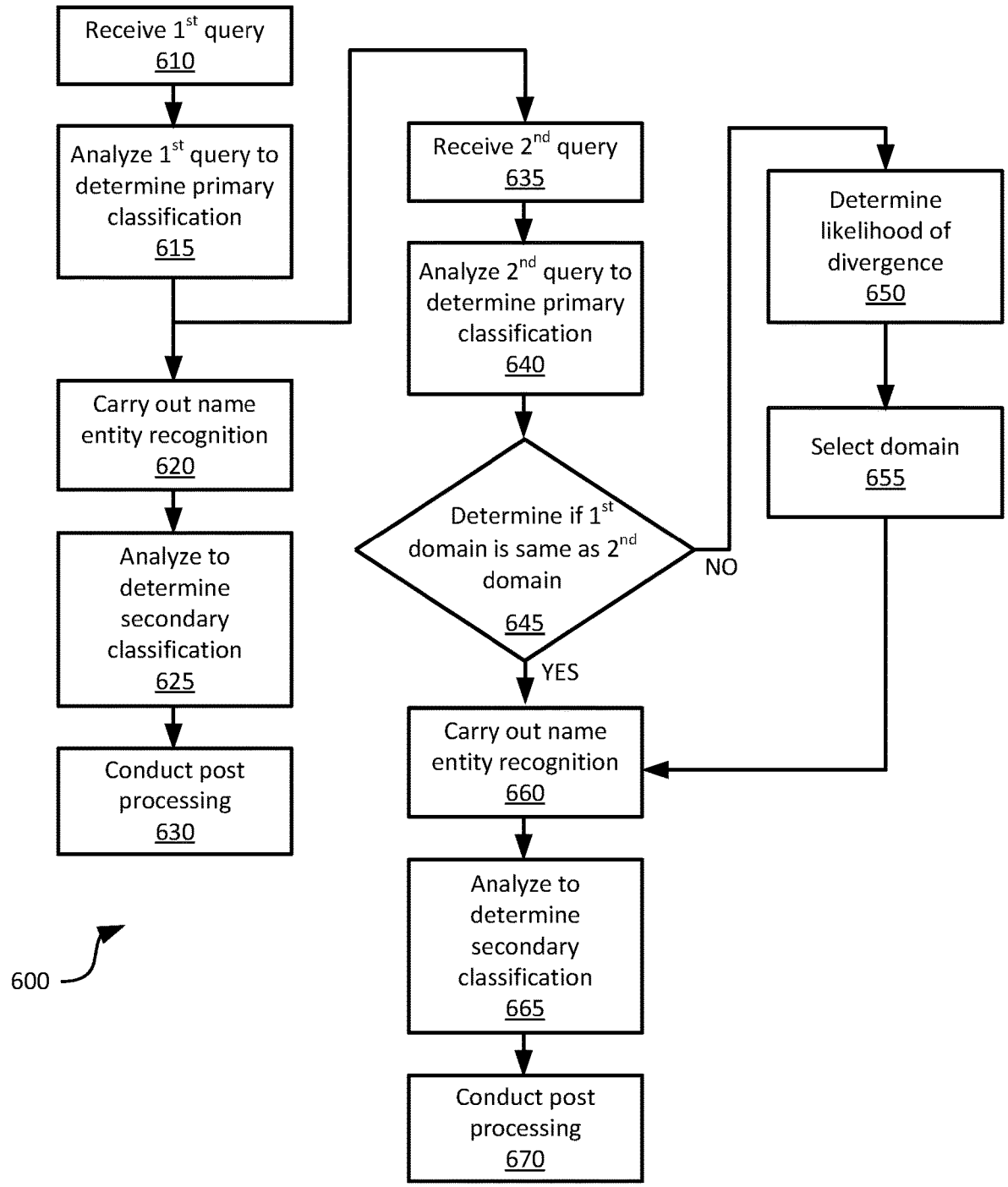
FIG. 4 is a flow chart of a method of classifying queries based on contextual information in accordance with another embodiment.

Referring to FIG. 4, another method of processing queries carried out by the system 50 using a natural language processing engine in the server 54 is represented in the form of a flow-chart and indicated generally at 600. In order to assist in the explanation of the method 600, it will be assumed that the method 600 is performed using the system 50. Furthermore, the following discussion of the method 600 will lead to further understanding of the system 50 and its various components. In particular, it is to be understood that in one embodiment, the programming instructions 100 of the server 54 direct the processor 68 to carry out the methods discussed below. However, it is to be understood that the system 50 and/or the method 600 can be varied, and need not work exactly as discussed herein in conjunction with each other, and that such variations are within the scope of the present invention. Furthermore, it is to be emphasized, that method 600 need not be performed in the exact sequence as shown and that various blocks can be performed in parallel rather than in sequence; hence the elements of the method 600 are referred to herein as "blocks" rather than "steps". In particular, it is to be appreciated that block 620 and block 635 can be carried out simultaneously.

Beginning at block 610, the server 54 receives a first query via the network interface 60 from the client device 70. In the present embodiment, the first query is a text string received from the client device 70; however, it is to be appreciated, with the benefit of this specification, that the type and format of the first query that is received is not particularly limited. For example, the first query can be received in other formats such as an audio file, an image file, a proprietary format, or in an encrypted format. Furthermore, the first query can also be received in a pre-processed format from the client device 70.

Block 615 comprises analyzing the first query received at the server 54 to determine a primary classification for the first query. In particular, block 615 comprises determining a first domain associated with the first query. The manner by which the first query is analyzed is not particularly limited and includes the manners discussed above in connection with block 510.

Block 620 comprises carrying out name entity recognition on the first query. The manner by which the name entity recognition is carried out is not particularly limited and includes the manners discussed above in connection with block 520.

Block 625 comprises analyzing the first query to determine a secondary classification for the first query. The manner by which the first query is analyzed is not particularly limited and includes the manners discussed above in connection with block 530.

Block 630 comprises conducting post processing on the first query. The manner by which the first query is analyzed is not particularly limited and includes the manners discussed above in connection with block 540.

It is to be appreciated by a person of skill in the art that the portion of the method 600 outline by blocks 615 to 630 is similar to the method 500. Accordingly, the first query received by the method 600 is processed similar to the method 500.

Block 635 comprises receiving a second query via the network interface 60 from the client device 70 subsequent to the first query. The manner by which the second query is received is not particularly limited and includes the manners discussed above in connection with block 610. Furthermore, the execution of block 635 need not occur in the sequence shown in FIG. 4 and other sequences are contemplated.

Block 640 comprises analyzing the second query received at the server 54 to determine a primary classification for the second query. In particular, block 640 comprises determining a second domain associated with the second query. The manner by which the second query is analyzed is not particularly limited and includes the manners discussed above in connection with block 615 applied to the second query. In the present embodiment, block 640 includes an additional and optional step to exclude content after cue phrases of the second query. Content after cue phrases are excluded from consideration because the content can skew the determination of the primary classification. Cue phrases are connective expressions linking a previous statement. Therefore, the words appearing after the cue phrases can lead to mistaken classifications by indicating that the second query should be in another domain. For example, if the first query is "Please find emails from Bob", followed by a second query "Please show the ones about sushi restaurants", the cue phrase "the ones about" would result in the words "sushi restaurant" being excluded from consideration. It is to be appreciated that by ignoring "sushi restaurants", the determination of the second domain would not be guided towards restaurants when the client device 70 is requesting information about emails from Bob that referred to sushi restaurants. It is to be appreciated that other modifications to manner by which the second query is analyzed are contemplated. In other embodiments the second query can be analyzed identical or similar to the manner carried out in block 615, such as using the same set of operations by calling the same programming routine and analyzing the second query including the cue phrases.

Block 645 comprises determining whether the second domain determined at block 640 is the same as the first domain determined at block 615. The manner in which the determination is made is not particularly limited and can involve various operations which can be carried out by the processor. In the present embodiment, the first domain determined at block 615 is stored in the memory storage unit 64 in a data record and the processor 68 carries out a compare operation to determine if the first domain stored in the data record is equal to the second domain determined at block 640. If the determination results in "no", then the method 600 proceeds to block 650.

Block 650 comprises determining the likelihood of divergence of the second domain from the first domain. The manner by which the likelihood of divergence is determined is not particularly limited and can include various methods. For example, in the present embodiment, the determination is made by calculating a Kullback-Leibler divergence value of the second domain determined in block 640 from the first domain determined in block 615.

In the present embodiment, a Kullback-Leibler divergence value can be calculated for multiple features of the second query. The manner by which the features are recognized in the second query is not particularly limited. For example, the features can be identified using pattern matching techniques based on known patterns stored in a database on the memory storage unit 64. Accordingly, the Kullback-Leibler divergence value (KLD) can be calculated using the formula:

$$KLD = \ln\left(\frac{P(i)}{Q(i)}\right)P(i)$$

where $P(i)$ is the probability that a feature is in the second domain determined at block 640 and $Q(i)$ is the probability that the feature is in the first domain determined at block 615. The manner by which $P(i)$ and $Q(i)$ are calculated is not particularly limited. In the present embodiment, each probability is determined by dividing the number of times the feature appears within a training set of the respective domain. In other embodiments, $P(i)$ and $Q(i)$ can be calculated using a parameterized distribution, such as a Gaussian distribution, where the parameters are estimated. In the present embodiment, the likelihood of divergence is predetermined to be the sum of the Kullback-Leibler divergence values for the features. In the present embodiment, all Kullback-Leibler divergence values less than zero are discarded or excluded from the calculation of the sum. However, it is to be appreciated that in other embodiments, the Kullback-Leibler divergence values for the features can be added whether the value is greater than or less than zero.

Block 655 comprises selecting a first domain determined at block 615 and the second domain determined at block 640 for further processing in the method 600 based on the likelihood of divergence. The manner by which the likelihood of divergence is determined is not particularly limited and can include various methods. Continuing with the example above, the selection can be made based on the sum of the Kullback-Leibler divergence values as described above in the description of block 650. For example, the second domain determined at block 640 can be selected when the sum of the Kullback-Leibler divergence values is greater than a predetermined threshold. In the present embodiment, the predetermined threshold is set to zero. However, it is to be appreciated that the predetermined threshold can be set at any value to achieve the desired results. It is to be appreciated, with the benefit of this specification, that if the sum of the Kullback-Leibler divergence values is equal to or less than the predetermined threshold, the first domain determined at block 615 will be selected.

Returning to block 645, if the determination result returns a "yes", then the method 600 proceeds directly to block 660. It is to be appreciated that if the result is a "yes", it means that the first domain determined at block 615 is the same as the second domain determined at block 640. Accordingly, the second domain determined at block 640 can be used for further processing in the method 600. Therefore, it is to be appreciated by a person of skill in the art that the selection of the domain at block 655 will be moot and that by making the determination at block 645, several computational operations would not need to be carried out, and therefore the speed by which the method 600 is carried out by the processor 68 is improved. In other embodiments, it is contemplated that the block 645 can be omitted and that blocks 650 and 655 be carried out each time.

Block 660 comprises carrying out name entity recognition on the second query using the domain determined at either one of block 615 or block 640 selected by the method 600. The manner by which the name entity recognition is carried out is not particularly limited and includes the manners discussed above in connection with block 620.

Block 665 comprises analyzing the second query to determine a secondary classification for second first query. The manner by which the second query is analyzed is not particularly limited and includes the manners discussed above in connection with block 625.

Block 670 comprises conducting post processing on the second query. The manner by which the second query is analyzed is not particularly limited and includes the manners discussed above in connection with block 630.

The person skilled in the art will now recognize that method 600, the system 50 and their variants can have many different implementations. For example, it is to be appreciated that although FIG. 4 illustrates that the second query is received after carrying out block 615, it is not necessarily required. For example, the second query can be received as early as after the receiving the first query in block 610 and much later, such as after block 630 is completed.

Figure 5:
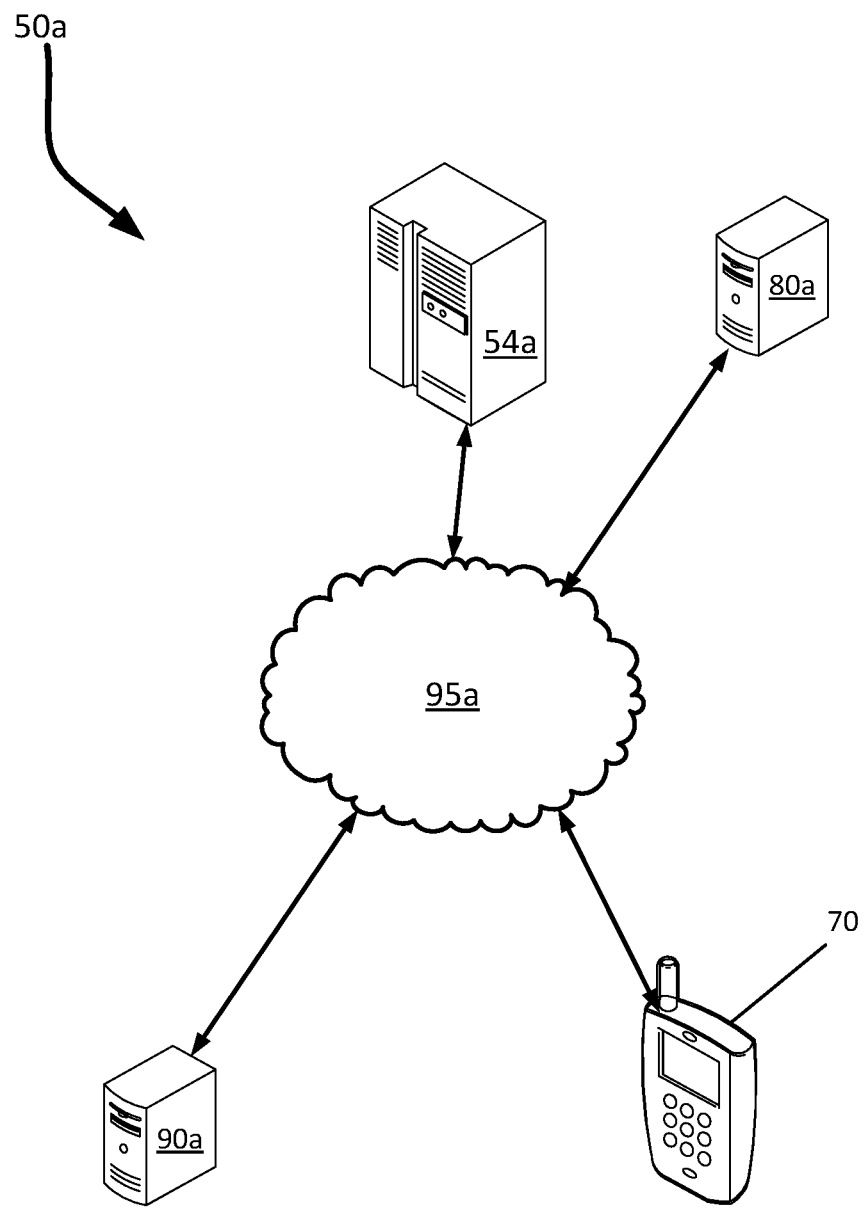
FIG. 5 is a schematic representation of a system for classifying queries based on contextual information in accordance with another embodiment.

Referring to FIG. 5, another embodiment of a computer network system is shown generally at 50a. Like components of the system 50a bear like reference to their counterparts in the system 50, except followed by the suffix "a". The system 50a includes a server 54a, a client device 70, and a data source 90a for providing information. In addition, the system 50a also includes a training device 80a. The server 54a, the client device 70, the training device 80a, and the data source 90a are connected by a network 95a. The network 95a is not particularly limited and can include any type of network such as those discussed above in connection with the network 95.

In the present embodiment, the server 54a can be any type of computing device generally used to receive input, process the input and provide output. The server 54a is not particularly limited and can include a variety of different devices such as those described above in connection with the server 54.

The data source 90a is generally configured to provide information upon receiving an input query. The data source 90a is not particularly limited and can include functionality and features discussed above in connection with the data source 90.

In the present embodiment, the system 50a further includes the training device 80a. The training device 80a can be any type of computing device capable of communicating with the server 54a as well as receiving training input. It is to be appreciated that the training device 80a includes programming instructions in the form of codes stored on a computer readable medium for evaluating training data and for computation of divergence values, such as a Kullback-Leibler divergence value. For example, the training device 80a can be any one of a personal computer, a laptop computer, a portable electronic device, a gaming device, a mobile computing device, a portable computing device, a tablet computing device, a personal digital assistant, a cell phone, a smart phone or the like. In the present embodiment, the training device 80a is generally configured to output two queries to a user and to receive input indicating whether the two queries are in the same domain. In addition, the training device 80a is generally configured to calculate the divergence value of a feature for a given pair of domains. The format of the input is not particularly limited. For example, the training input can be received as an audio input via a microphone, as a text string received via a keyboard-type input device, or via another input means such as through a network interface device.

It is to be re-emphasized that the system 50a described above is a non-limiting representation only. For example, although the network 95a of the present embodiment shown in FIG. 5 connects the server 54a, the client device 70, the training device 80a, and the data source 90a, other embodiments can include separate networks for connecting the server 54a, the client device 70, the training device 80a, and the data source 90a separately.

Figure 6:
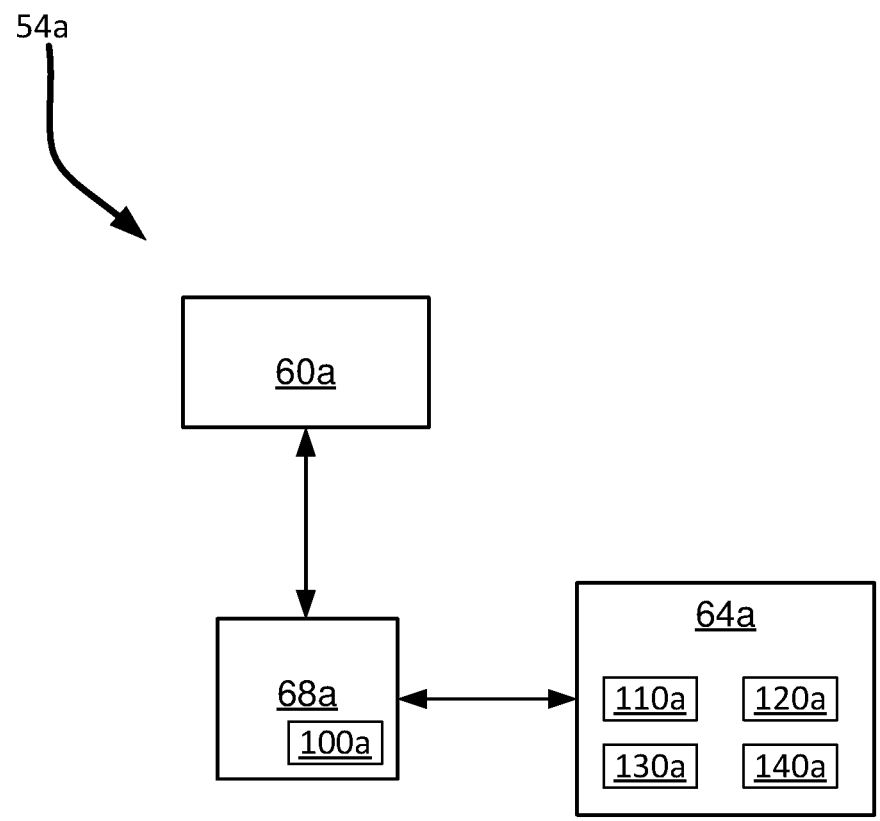
FIG. 6 is a schematic representation of a server in accordance with the embodiment shown in FIG. 5.

Referring to FIG. 6, a schematic block diagram showing various components of the server 54a is provided. Like components of the server 54a bear like reference to their counterparts in the server 54, except followed by the suffix "a". It should be emphasized that the structure in FIG. 6 is purely exemplary and several different implementations and configurations for the server 54a are contemplated. The server 54a includes a network interface 60a, a memory storage unit 64a, and a processor 68a.

The memory storage unit 64a can be of any type such as those discussed in connection with the memory storage unit 64. In the present embodiment, the memory storage unit 64a is divided into a plurality of data structures 110a, 120a, 130a, and 140a. Each of the data structures 110a, 120a, 130a, and 140a can be configured or occupy a fixed location within the memory storage unit 64a or can be reassigned as needed by an allocation application. It is to be appreciated with the benefit of this description that in the present embodiment where the data structures 110a, 120a, 130a, and 140a are physically fixed within the memory storage unit 64a, the memory storage unit 64a can provide faster access to the processor 68a since the location of data would not need to be looked up in an allocation table. For example, the data structure 110a can be configured to store a plurality of programming instructions for controlling the processor 68a which can include the programming instructions 100a. Since the processor 68a generally has limited cache memory, the programming instructions 100a physically within the processor 68a are generally limited to a few commands. Accordingly, the processor 68a can continually obtain further instructions from the data structure 110a as needed during the execution of an application. The data structure 120a can include a database having multiple data records associated with threshold Kullback-Leibler divergence values. In the present embodiment, the data structure 120a includes records containing a domain pair and a predetermined threshold Kullback-Leibler divergence value associated with the domain pair. Accordingly, the processor 68a can access the data structure 120a to retrieve the threshold Kullback-Leibler divergence value to use when presented with an entity as discussed in greater detail below. The data structure 130a can include a queue for storing input queries. It is to be appreciated that in the present embodiment, the server 54a can receive multiple input queries from the client device 70 or additional client devices (not shown) such that the server 54a cannot process the input queries as fast as they are received. The data structure 130a can be used to queue input queries received too quickly together such that each of the input queries can be processed in the order that they are received or in an order of assigned priority. Similarly, the data structure 140a can include a queue for storing the input queries for subsequent post processing after a secondary classification has been completed such as described below.

Figure 7:
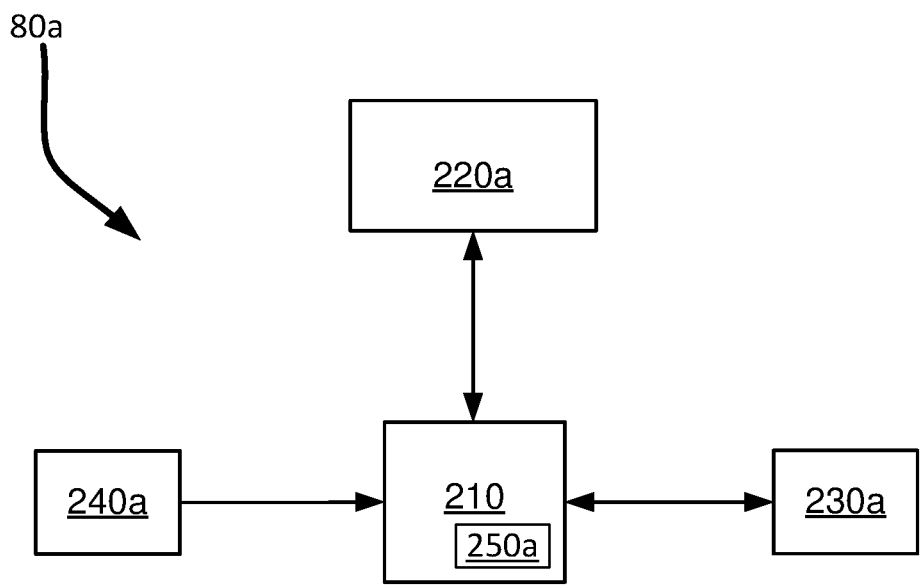
FIG. 7 is a schematic representation of a training device in accordance with the embodiment shown in FIG. 5.

Referring to FIG. 7, a schematic block diagram showing various components of the training device 80a is provided. It should be emphasized that the structure in FIG. 7 is purely exemplary and several different implementations and configurations for the training device 80a are contemplated. The training device 80a includes a processor 210a, a network interface 220a, a memory storage unit 230a, and an input device 240a.

The network interface 220a is not particularly limited and can include various network interface devices such as a network interface controller (NIC) capable of communicating with the client device 70, the server 54a, and the data source 90a across the network 95a. In the present embodiment, the network interface 220a is generally configured to connect to the network 95a via a standard Ethernet connection.

The memory storage unit 230a can be of any type such as non-volatile memory (e.g. Electrically Erasable Programmable Read Only Memory (EEPROM), Flash Memory, hard disk, floppy disk, optical disk, solid state drive, or tape drive) or volatile memory (e.g. random access memory (RAM)). In the present embodiment, the memory storage unit 230a is generally configured to store input queries received from the client device 70 for processing as well as any input queries that may need to be sent on to the data source 90a. Furthermore, the memory storage unit 230a is configured to store data records representing the results of training. In addition, the memory storage unit 230a is configured to store codes for directing the processor 210a for carrying out computer implemented methods. For example, the codes can include the programming instructions 250a further described below.

The input device 240a is generally configured to receive training input from a trainer. It is to be appreciated that the input device 240a is not particularly limited and can include a keyboard, microphone, a pointer device, a touch sensitive device, or any other device configured to generate signals in response from the external environment. For example, in the present embodiment, the input device 240a is a microphone configured to receive audio input. In other embodiments, training input can be received via the network interface 220a, such as when the training is carried out remotely or crowd sourced over a network.

The processor 210a is not particularly limited and is generally configured to execute programming instructions 250a for tuning a threshold Kullback-Leibler divergence value associated with a domain pair. The manner by which the threshold Kullback-Leibler divergence value associated with a domain pair is determined is not particularly limited and will be discussed in greater detail below. In the present embodiment, the programming instructions 250a are generally configured to calculate the Kullback-Leibler divergence value sum of a query and receive input indicating whether the query is within the same domain as a prior query. It is to be appreciated by a person of skill in the art that the programming instructions 250a are not limited to calculating a Kullback-Leibler divergence value sum, For example, the programming instructions 250a can be configured to determine the difference in pointwise mutual information between the feature and the distribution as an alternative.

Figure 8:
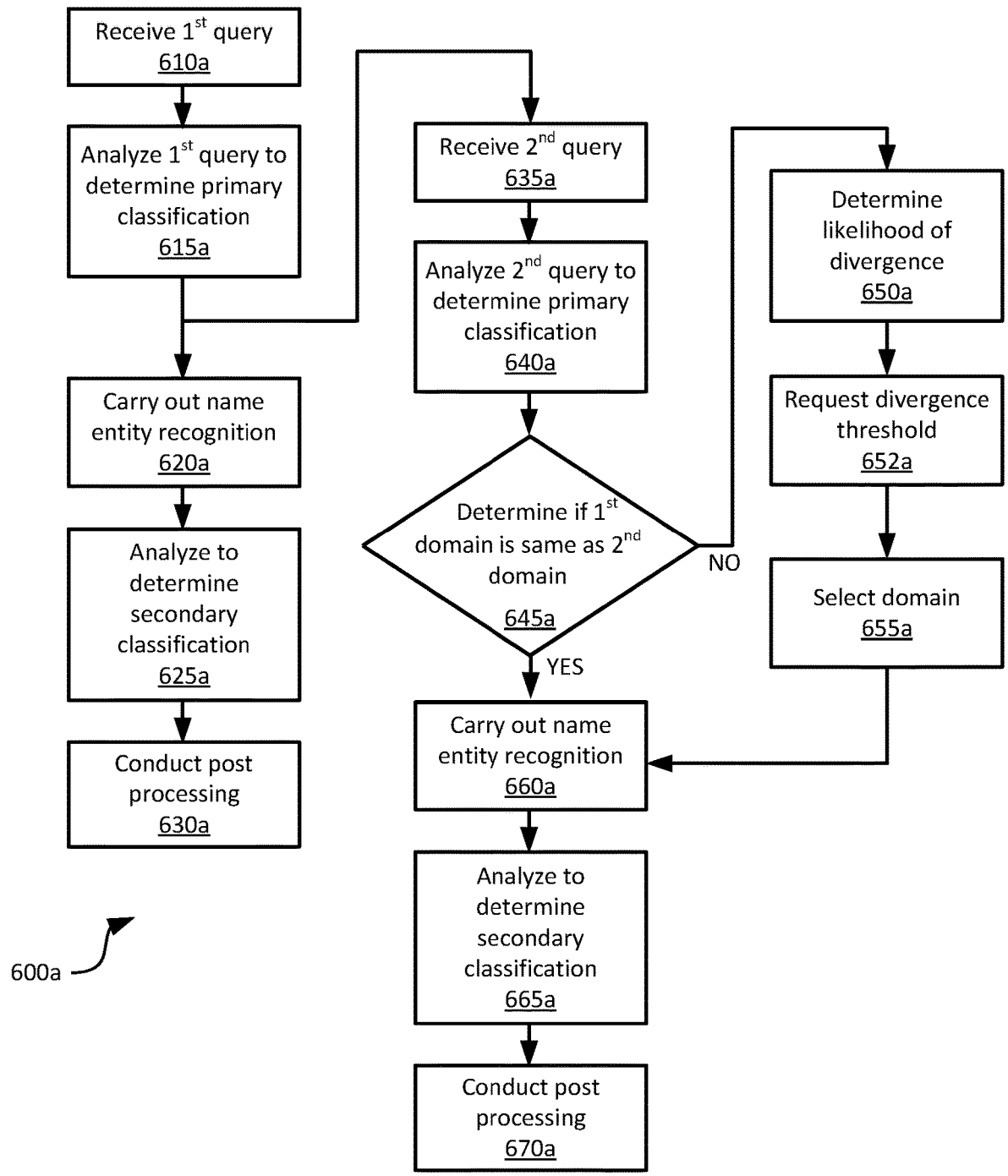
FIG. 8 is a flow chart of a method of classifying queries based on contextual information in accordance with another embodiment.

Referring to FIG. 8, a method of processing queries carried out by the system 50a using a natural language processing engine in the server 54a is represented in the form of a flow-chart and indicated generally at 600a. Like blocks of the method 600a bear like reference to their counterparts in the method 600, except followed by the suffix "a". In order to assist in the explanation of the method 600a, it will be assumed that the method 600a is performed using the system 50a. Furthermore, the following discussion of the method 600a will lead to further understanding of the system 50a and its various components. In particular, it is to be understood that in one embodiment, the programming instructions 100a of the server 54a direct the processor 68a to carry out the methods discussed below. However, it is to be understood that the system 50a and/or the method 600a can be varied, and need not work exactly as discussed herein in conjunction with each other, and that such variations are within the scope of the present invention. For example, the method 600a can be carried out using system 50 with minor modifications. Furthermore, it is to be emphasized, that method 600a need not be performed in the exact sequence as shown and that various blocks can be performed in parallel rather than in sequence; hence the elements of the method 600a are referred to herein as "blocks" rather than "steps". In particular, it is to be appreciated that block 620a and block 635a can be carried out simultaneously.

Beginning at block 610a, the server 54a receives a first query via the network interface 60a from the client device 70. In the present embodiment, the first query is a text string received from the client device 70; however, it is to be appreciated, with the benefit of this specification, that the type and format of the first query that is received is not particularly limited and can include those discussed above in connection with block 610.

Block 615a comprises analyzing the first query received at the server 54a to determine a primary classification for the first query. The manner by which the first query is analyzed is not particularly limited and includes the manners discussed above in connection with block 615. In the present embodiment, block 615a identifies a first domain for the first query.

Block 620a comprises carrying out name entity recognition on the first query. The manner by which the name entity recognition is carried out is not particularly limited and includes the manners discussed above in connection with block 620.

Block 625a comprises analyzing the first query to determine a secondary classification for the first query. The manner by which the first query is analyzed is not particularly limited and includes the manners discussed above in connection with block 625.

Block 630a comprises conducting post processing on the first query. The manner by which the first query is analyzed is not particularly limited and includes the manners discussed above in connection with block 630.

Block 635a comprises receiving a second query via the network interface 60a from the client device 70 subsequent to the first query. The manner by which the second query is received is not particularly limited and includes the manners discussed above in connection with block 610a. Furthermore, the execution of block 635a need not occur in the sequence shown in FIG. 8 and other sequences are contemplated.

Block 640a comprises analyzing the second query received at the server 54a to determine a primary classification for the second query. In the present embodiment, block 640a comprises determining a second domain associated with the second query. The manner by which the second query is analyzed is not particularly limited and includes the manners discussed above in connection with block 615a applied to the second query.

Block 645a comprises determining whether the second domain determined at block 640a is the same as the first domain determined at block 615a. The manner in which the determination is made is not particularly limited and can involve various operations which can be carried out by the processor 68a. In the present embodiment, the first domain determined at block 615a is stored in the memory storage unit 64a in a data record and the processor 68a carries out a compare operation to determine if the first domain stored in the data record is equal to the second domain determined at block 640a. If the determination results in "no", then the method 600a proceeds to block 650a.

Block 650a comprises determining the likelihood of divergence of the second domain from the first domain. The manner by which the likelihood of divergence is determined is not particularly limited and includes the manners discussed above in connection with block 650. For example, in the present embodiment, the determination is made by calculating a sum of the Kullback-Leibler divergence values for each feature in the second query from the first domain to the second domain.

Block 652a comprises requesting and receiving a threshold Kullback-Leibler divergence value associated with the domain pair consisting of the domain determined at block 615a and block 640a. The manner by which the threshold Kullback-Leibler divergence value associated with the domain pair is obtained is not particularly limited. In the present embodiment, a table of threshold Kullback-Leibler divergence values along with possible domain pairs is stored in a database in the data structure 120a. Accordingly, block 652a can involve retrieving the data record of the desired domain pair. In other embodiments, the table can be stored on another machine such as the training device 80a or elsewhere in the cloud.

Block 655a comprises selecting a domain based on the likelihood of divergence. The manner by which the likelihood of divergence is determined is not particularly limited and can include various methods. In the present embodiment, the selection can be made by comparing the sum of Kullback-Leibler divergence values calculated at block 650a with the threshold Kullback-Leibler divergence value received at block 652a.

Returning to block 645a, if the determination result returns a "yes", then the method 600a proceeds directly to block 660a. It is to be appreciated that if the result is a "yes", it means that the first domain determined at block 615a is the same as the second domain determined at block 640a. Accordingly, the second domain determined at block 640a can be used for further processing in the method 600a. Therefore, it is to be appreciated by a person of skill in the art that the selection of the domain at block 655a will be moot and that by making the determination at block 645a, several computational operations would not need to be carried out, and therefore the speed by which the method 600a is carried out by the processor 68a is improved. In other embodiments, it is contemplated that the block 645a can be omitted and that blocks 650a, 652a, and 655a be carried out each time.

Block 660a comprises carrying out name entity recognition on the second query using the domain determined at either one of block 615a or block 640a selected by the method 600a. The manner by which the name entity recognition is carried out is not particularly limited and includes the manners discussed above in connection with block 620a.

Block 665a comprises analyzing the second query to determine a secondary classification for second first query. The manner by which the second query is analyzed is not particularly limited and includes the manners discussed above in connection with block 665.

Block 670a comprises conducting post processing on the second query. The manner by which the second query is analyzed is not particularly limited and includes the manners discussed above in connection with block 670.

Figure 9:
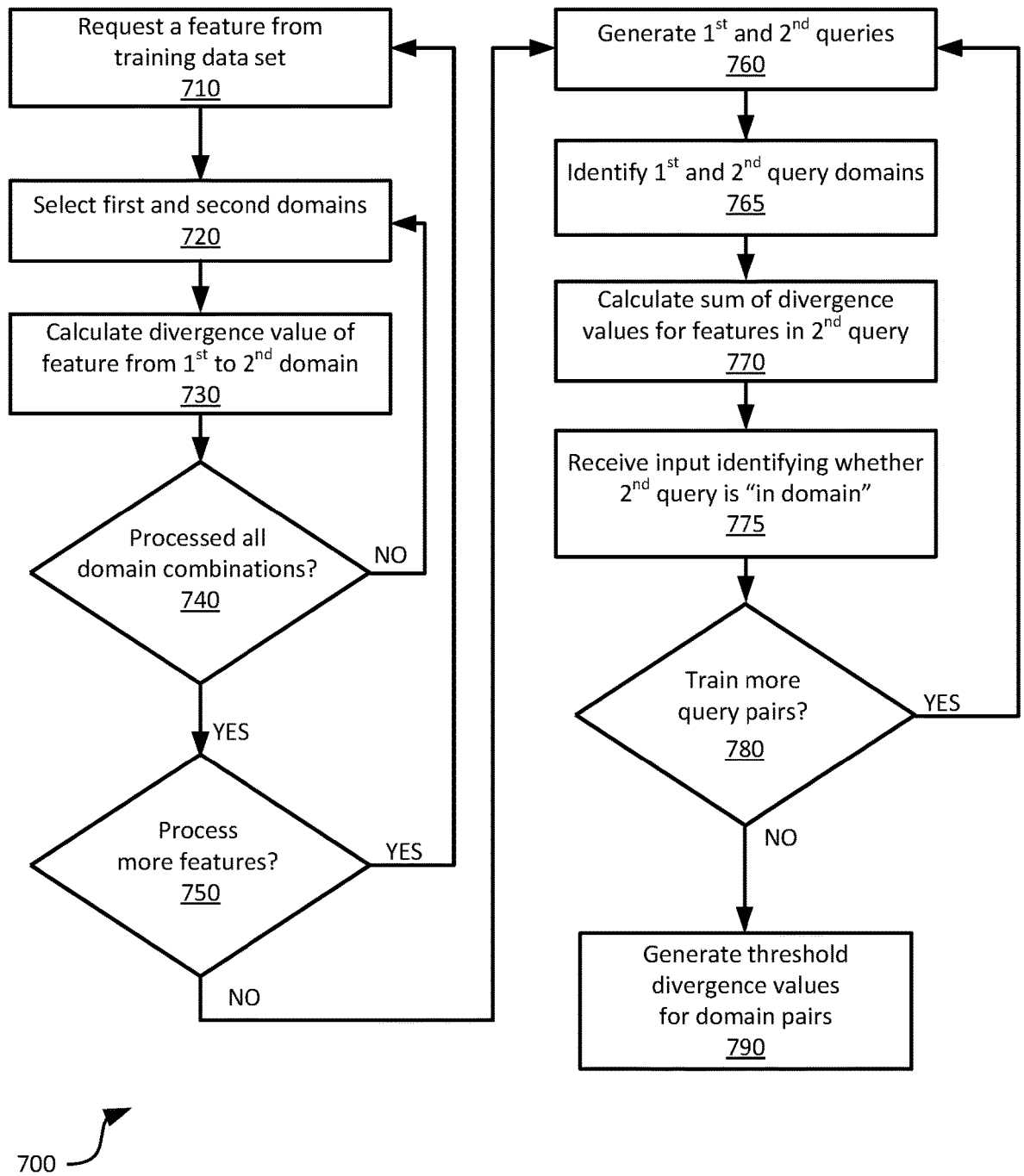
FIG. 9 is a flow chart of a method of training a system in accordance with an embodiment.

Referring to FIG. 9, a method of training the system 50a using the training device 80a is shown generally at 700. In order to assist in the explanation of the method 700, it will be assumed that the method 700 is performed using the system 50a. Furthermore, the following discussion of the method 700 will lead to further understanding of the training device 80a. In particular, it is to be understood that in one embodiment, the programming instructions 250a controlling the processor 210a can be used to carry out the method 700.

Block 710 comprises requesting a feature from a training data set having a plurality of features. The manner by which the request is sent is not particularly limited. In the present embodiment, the training data set includes training data obtained from a third party source. For example, and to provide greater clarity to the understanding of the present embodiment of the training device 80a, it can be assumed that a request is sent to a third party provider of training data. In response, the provider returns a feature (f1) which can be in one of five domains: A, B, C, D, and E.

Block 720 comprises selecting a first domain and second domain associated with a first feature selected from the training data set. The manner by which the first and second domains are selected is not particularly important. For example, the domains can be randomly selected or selected based on other criteria. Continuing with the example above, the processor 210a can be assumed to have selected domains A and B to be the first and second domain, respectively.

Block 730 comprises calculating the divergence value of the feature from the first domain to the second domain that were selected in block 720. The manner by which the divergence value is calculated is not particularly limited and includes the manners discussed above in connection determining the Kullback-Leibler divergence value of the feature from domain between domains. Continuing with the present example, the Kullback-Leibler divergence value for feature (f1) from domain A to domain B can be expressed as:

$$KLD = \ln\left(\frac{P_A(f1)}{Q_B(f1)}\right) P_A(f1)$$

Once calculated, the divergence value for this feature is stored in a data record in the memory storage unit 230a.

Block 740 comprises determining whether all domain combinations have been processed. The manner in which the determination is made is not particularly limited. For example, the training device 80a can be configured to process every possible combination of domains associated with the training data set. If the determination results in "no", the method 700 proceeds to back to block 720 where different first and second domains are selected. Continuing with the present example, it is to be appreciated that each iteration calculates the Kullback-Leibler divergence value for various combinations of domains. Accordingly, it is to be appreciated with the benefit of this specification that Kullback-Leibler divergence values for domain pairs of a feature are calculated and stored on separate data records or in a database.

Table 3 provides a possible exemplary set of data records of the possible combinations for the requested feature (f1). It is to be appreciated that the Kullback-Leibler divergence values shown in table 3 are purely exemplary. In table 3, the twenty domain pairs represent the possible domain combinations in the present example with five possible domains. In other embodiments with more or less possible domains, the total number of combinations can be different.

TABLE 3

Exemplary result of KLD calculation for specific feature selected in block 710

| First and Second Domain (block 720) | KLD value (block 730) |
|---|---|
| A-B | 0.11 |
| A-C | 0.05 |
| A-D | 0.28 |
| A-E | 0.20 |
| B-A | 0.13 |
| B-C | 0.25 |
| B-D | 0.20 |
| B-E | 0.07 |
| C-A | 0.09 |
| C-B | 0.02 |
| C-D | 0.30 |
| C-E | 0.28 |
| D-A | 0.10 |
| D-B | 0.16 |
| D-C | 0.10 |
| D-E | 0.24 |
| E-A | 0.14 |
| E-B | 0.29 |
| E-C | 0.22 |
| E-D | 0.01 |

Returning to block 740, if the determination result returns a "yes", the method 700 proceeds to block 750. Block 750 comprises determining whether more features should be processed. The manner in which the determination is made is not particularly limited. For example, the training device 80a can be configured to perform a predetermined number of calculations and block 750 will continue to return "yes" until the number is reached. As another example, the training device 80a can be configured to train for a predetermined period of time. As yet another example, the training device 80a can be configured to process every possible feature in the training data set. If the determination results in "yes", then the method 700 proceeds to back to block 710 where another feature is requested from the training data set. Continuing with the present example, a table similar to table 3 above can be generated for each feature. Accordingly, it is to be appreciated with the benefit of this specification that Kullback-Leibler divergence values for each feature can be stored on separate data records.

If the determination result returns a "no" at block 750, the method 700 proceeds to block 760. Block 760 comprises generating first and second test queries. The manner by which the queries are generated is not particularly limited. In the present embodiment, the queries are retrieved from a query training data set separate from the training set providing the features at block 710. In other embodiments, the queries can be retrieved from the same training data set as used in the block 710, a third party or crowd sourcing.

Block 765 comprises identifying a first domain associated with the first query and identifying a second domain associated with the second query. The manner by which the domains are identified is not particularly important. For example, the domains can be determined by the training device 80a using similar techniques that would be used by the server 54a, such as in the execution of block 615a. In some embodiments, the domains of the queries can be included in the query training data set and simply retrieved from the data set. It is to be appreciated that when the domains are included with the query training data set, the training device 80a would perform fewer calculations but the size of the query training data set would be larger.

Block 770 comprises calculating the sum of the divergence values in the second query generated at block 760. It is to be appreciated by a person of skill in the art having the benefit of this description that each query generally includes more than one feature. In the present embodiment, the sum is calculated by simply adding the Kullback-Leibler divergence values for each of features in the second query using information previously determined, such as that presented in table 3. In particular, the processor 210a would identify features in the second query and cross reference it to the tables for each feature. Continuing with the example above and shown in FIG. 3, it can be assumed that block 760 generates a first query pair where the second query includes only a single feature (f1) identified to be in domain B at block 765 (as noted above, a query generally has more than one feature; however, a query with a single feature is possible and is used here for illustrative purposes). Furthermore, the first query can be assumed to be identified as being in domain A. Accordingly, table 3 would indicate that the Kullback-Leibler divergence value would be 0.11 and since it is the only feature in the second query, the sum determined at block 775 would be 0.11.

Block 775 comprises receiving input from the input device 240a indicating whether the domain for the second query should remain the same as the domain for the first query or be switched to the second domain. The manner by which the input is received is not particularly limited. In the present embodiment the input includes audio input spoken into a microphone. Once received, the input indicating whether the features are in the same domain is added to the data record in the memory storage unit 230a.

Block 780 comprises determining whether training should continue with more query pairs. The manner in which the determination is made is not particularly limited. For example, the training device 80a can be configured to perform a predetermined number of training query pairs and block 780 will continue to return "yes" until the number is reached. As another example, the training device 80a can be configured to train for a predetermined period of time. As yet another example, the training device 80a can be configured to process every possible feature in the training data set. If the determination results in "yes", then the method 700 proceeds to back to block 760 where query pair is generated.

Continuing with the present example, table 4 provides a possible exemplary set of data records of the possible sums of Kullback-Leibler divergence values for features in a second query of a query pair along with the input indicating whether the domain should remain the same as the domain of the first query. It is to be appreciated that the values shown in table 3 are purely exemplary. In table 4, twenty pairs of queries are shown. It is to be appreciated that the number of query pairs is not limited and that other embodiments may have more or less query pairs.

TABLE 4

Exemplary result of query pair training between domain A-B (Block 780)

| Query Pair | KLD Sum (block 770) | Stay in First Domain? (block 775) |
|---|---|---|
| 1 | 0.11 | Yes |
| 2 | 0.46 | No |
| 3 | 0.40 | Yes |
| 4 | 0.22 | Yes |
| 5 | 0.55 | No |
| 6 | 0.25 | Yes |
| 7 | 0.10 | Yes |
| 8 | 0.49 | No |
| 9 | 0.15 | Yes |
| 10 | 0.29 | Yes |
| 11 | 0.75 | No |
| 12 | 0.53 | No |
| 13 | 0.39 | Yes |
| 14 | 0.66 | No |
| 15 | 0.34 | Yes |
| 16 | 0.69 | No |
| 17 | 0.27 | Yes |
| 18 | 0.55 | No |
| 19 | 0.64 | No |
| 20 | 0.38 | Yes |

Returning to block 780, if the determination result returns a "no", then the method 700 proceeds to block 790. Block 790 comprises generating a threshold Kullback-Leibler divergence value for a domain pair. The manner by which the threshold Kullback-Leibler divergence value of a feature is calculated is not particularly limited. In the present embodiment, the threshold Kullback-Leibler divergence value is optimized using a linear scan. In other embodiments, the threshold Kullback-Leibler divergence value can be defined as the midpoint between the average of the KLD values of features in the same domain and the average of the KLD values of the features indicated as not being in the same domain. Continuing with the present example shown in table 4, the threshold Kullback-Leibler divergence value from domain A to domain B can be calculated to be 0.45 since each instance where the Kullback-Leibler divergence value is above this indicates that the domain should be switched. It is to be appreciated, with the benefit of this description, that various other methods can be used to optimize the threshold Kullback-Leibler divergence value, such as hyperparameter optimization techniques. Once the threshold Kullback-Leibler divergence value has been determined for a domain pair, a data record can be generated indicating that the threshold Kullback-Leibler divergence value for the domain pair A-B is 0.45. This data record can then be uploaded to the server 54a and stored in data structure 120a.

It is to be appreciated that method 700 can be subsequently carried out for other domain pairs using features from the training data set such a threshold Kullback-Leibler divergence value is calculated for the possible domain pairs. It is to be appreciated that the threshold Kullback-Leibler divergence value is not symmetrical and may be different if the first and second domains are reversed. For example, the threshold Kullback-Leibler divergence value for domain pair B-A can be different from the threshold Kullback-Leibler divergence value for the domain pair A-B. Accordingly, in the present example with 5 domains, twenty threshold Kullback-Leibler divergence values would be calculated.

It is to be re-emphasized that the method 700 described above is a non-limiting representation only and that variations are contemplated. As an example of a variation, it is to be appreciated with the benefit of this specification that blocks 750 and 760 can be switched such that the calculations are performed prior to receiving input from the input device 240a indicating whether the feature should stay in the first domain determined at block 720 or switch to the second domain determined at block 730. Accordingly, the resource intensive calculations can be carried out on a different device and the results transferred to the training device 80a where input can be received and matched with the transferred results.

As another example of a variation, instead of processing the training data set, portions of the training data set can be selectively processed using a modified version of the method 700. In particular, since the training data set may evolve over time, change portions of the training data set can be processed to update the data records stored in the data structure 120a. It is to be understood by a person of skill in the art with the benefit of this description that updates can be periodically pushed from the training device 80a to the server 54a. As another example of a variation, block 760 can be modified to not require processing all possible combinations with a specific feature, such as when the training data set is too large to carry out this task.

Various advantages will now be apparent to a person of skill in the art. Of note is the ability use contextual information to determine the best domain to carry out further processing of the second query. For example, if the client device 70 is requesting a follow up to the first query, such as narrowing the subject of emails to search, the natural processing language engine of the server 54 would be able to recognize this and to perform the function rather than completely switching domains as could have been the case without using the contextual information. Furthermore, if the client device is requesting something that is a complete change of subject, the natural processing language engine of the server 54 would be able to recognize that the second query is not related to the first query and use the second domain determined at block 640.

While specific embodiments have been described and illustrated, such embodiments should be considered illustrative only and should not serve to limit the accompanying claims.

What is claimed is:

1. A server for classifying queries based on contextual information, the server comprising:
   a network interface configured to receive a first query and a second query, wherein the second query is subsequent to the first query;
   a memory storage unit for storing programming instructions; and
   at least one processor in communication with the network interface and the memory storage unit, the processor configured to perform operations, comprising:
      determine a first domain associated with the first query based on classifying a first plurality of entities of the first query using a set of classification operations;

determine a second domain associated with the second query based on classifying a second plurality of entities of the second query using the set of classification operations, wherein the second domain is distinct from the first domain;

determine a likelihood of domain divergence of the second domain from the first domain by comparing a first probability that a feature of the second query is in the first domain to a second probability that the feature of the second query is in the second domain;

select, based on the determined likelihood of domain divergence, one of the first domain associated with the first query or the second domain associated with the second query for processing the second query;

determine one or more name entities of the second query; and determine a subdomain associated with the second query based on the one or more name entities of the second query and the selected one of the first domain and the second domain.

2. The server of claim 1, wherein classifying the first plurality of entities of the first query is based on a support vector machine model to the first query.

3. The server of claim 1, wherein the processor is configured to analyze the first query and to analyze the second query using a similar set of operations.

4. The server of claim 1, wherein the processor is configured to classify the second plurality of entities of the second query under a different context than the first query after excluding at least one of the second plurality of entities from consideration.

5. The server of claim 1, wherein the processor is configured to determine the likelihood of domain divergence by determining a Kullback-Leibler divergence of the feature from the first domain to the second domain.

6. The server of claim 5, wherein the processor is configured to calculate a plurality of Kullback-Leibler divergences, the plurality of Kullback-Leibler divergences including the Kullback-Leibler divergence of the feature, and wherein each Kullback-Leibler divergence is associated with a feature of the second query.

7. The server of claim 6, wherein the processor is configured to calculate a sum of the plurality of Kullback-Leibler divergences.

8. The server of claim 7, wherein the processor is configured to select the second domain when the sum is greater than a predetermined threshold.

9. The server of claim 8, wherein the predetermined threshold is zero.

10. A method of classifying queries based on contextual information, the method comprising:

receiving a first query;

determining a first domain associated with the first query based on classifying a first plurality of entities of the first query using a set of classification operations;

receiving a second query subsequent to the first query;

determining a second domain associated with the second query based on classifying a second plurality of entities of the second query using the set of classification operations, wherein the second domain is distinct from the first domain;

determining a likelihood of domain divergence of the second domain from the first domain by comparing a first probability that a feature of the second query is in the first domain to a second probability that the feature of the second query is in the second domain;

selecting, based on the determined likelihood of domain divergence, one of the first domain associated with the first query or the second domain associated with the second query for processing the second query;

determining one or more entities of the second query; and determining a subdomain associated with the second query based on the one or more name entities of the second query and the selected one of the first domain and the second domain.

11. The method of claim 10, wherein classifying the first plurality of entities of the first query is based on a support vector machine model to the first query.

12. The method of claim 10, wherein classifying the first plurality of entities of the first query and classifying the second plurality of entities of the second query use a similar set of operations.

13. The method of claim 10, wherein determining the likelihood of domain divergence comprises determining a Kullback-Leibler divergence of the feature from the first domain to the second domain.

14. The method of claim 10, wherein classifying the second plurality of entities of the second query comprises classifying under a different context than the first query after excluding at least one of the second plurality of entities from consideration.

15. The method of claim 13, wherein a plurality of Kullback-Leibler divergences is calculated, the plurality of Kullback-Leibler divergences including the Kullback-Leibler divergence of the feature, and wherein each Kullback-Leibler divergence is associated with a feature of the second query.

16. The method of claim 15, wherein determining the likelihood of domain divergence comprises calculating a sum of the plurality of Kullback-Leibler divergences.

17. The method of claim 16, wherein the selecting comprises selecting the second domain when the sum is greater than a predetermined threshold.

18. The method of claim 17, wherein the predetermined threshold is zero.

19. A non-transitory computer readable medium encoded with instructions for classifying queries based on contextual information, the instructions for directing a processor to perform operations, comprising:

receive, via a network interface, a first query and a second query, the second query subsequent to the first query;

determine a first domain associated with the first query based on classifying a first plurality of entities of the first query using a set of classification operations;

determine a second domain associated with the second query based on classifying a second plurality of entities of the second query using the set of classification operations, wherein the second domain is distinct from the first domain;

determine a likelihood of domain divergence of the second domain from the first domain by comparing a first probability that a feature of the second query is in the first domain to a second probability that the feature of the second query is in the second domain;

select, based on the determined likelihood of domain divergence, one of the first domain associated with the first query or the second domain associated with the second query for processing the second query;

determining one or more entities of the second query; and determining a subdomain associated with the second query based on the one or more name entities of the second query and the selected one of the first domain and the second domain.

20. The non-transitory computer readable medium of claim 19, wherein selecting one of the first domain and the second domain further comprises selecting the second domain when the likelihood of domain divergence is greater than a predetermined threshold.

\* \* \* \* \*